United States Patent
Carlisle et al.

[11] Patent Number: 6,017,154
[45] Date of Patent: Jan. 25, 2000

[54] OPTICAL FIBER CONNECTOR WITH CABLE ANCHORING MEANS

[75] Inventors: Arthur Wallace Carlisle, Dunwoody; Jeffrey Harrison Hicks, Lilburn; Norman Roger Lampert, Norcross, all of Ga.

[73] Assignee: Lucent Technologies, Inc., Murray Hill, N.J.

[21] Appl. No.: 09/019,240

[22] Filed: Feb. 5, 1998

[51] Int. Cl.[7] ........................................... G02B 6/36
[52] U.S. Cl. ................................................. 385/86
[58] Field of Search ........................ 385/86, 60, 65, 385/69, 72, 78

[56] References Cited

U.S. PATENT DOCUMENTS

| | | | |
|---|---|---|---|
| 4,687,291 | 8/1987 | Stape et al. | 350/96.21 |
| 4,761,051 | 8/1988 | Crespo Ruiz et al. | 385/86 |
| 4,762,388 | 8/1988 | Tanaka et al. | 350/96.2 |
| 4,787,706 | 11/1988 | Cannon, Jr. et al. | 350/96.2 |
| 4,934,785 | 6/1990 | Mathis et al. | 350/96.21 |
| 5,073,042 | 12/1991 | Mulholland et al. | 385/86 |
| 5,138,678 | 8/1992 | Briggs et al. | 385/86 |
| 5,157,749 | 10/1992 | Briggs et al. | 385/60 |
| 5,371,821 | 12/1994 | Szegda | 385/86 |
| 5,440,658 | 8/1995 | Savage | 385/86 |
| 5,481,634 | 1/1996 | Anderson et al. | 385/76 |
| 5,521,998 | 5/1996 | Walles et al. | 385/86 |
| 5,559,917 | 9/1996 | Ott | 385/86 |
| 5,768,455 | 6/1998 | Konik | 385/86 |

*Primary Examiner*—Rodney Bovernick
*Assistant Examiner*—Robert E. Wise

[57] ABSTRACT

An optical fiber connector is disclosed for terminating an optical cable which has a plastic core and a surrounding jacket. The connector includes a body member which has a central bore extending therethrough within which is a longitudinally extending internally threaded portion dimensioned to grip the plastic jacket when the cable is screwed into the body member. The bore has a tapered section extending from the threaded portion to a cable entrant end of the body to facilitate insertion of an optical cable into the body.

7 Claims, 8 Drawing Sheets

OPTICAL FIBER CONNECTOR WITH CABLE ANCHORING MEANS

REFERENCE TO RELATED APPLICATIONS

This application is related to U.S. patent application Ser. No. 08/995,643 of J. M. Anderson et al., filed Dec. 22, 1997 and the disclosure of which is herein incorporated by reference.

FIELD OF THE INVENTION

This invention relates to optical connectors primarily for use with plastic optical fibers (POF), and having cable anchoring means therein.

BACKGROUND OF THE INVENTION

Present day telecommunications technology utilizes, to an increasing extent, optical fibers for signal transmission. The use of optical fibers, in turn, requires numerous collateral components especially adapted to handle the light or optical transmission, among which are optical fiber connectors, which are essential to virtually all optical fiber systems. Connectors may be used to join segments of fibers together to create longer lengths; to connect a fiber or fibers to active devices forming part of the communication system such as radiation sources, detectors, amplifiers, repeaters, or the like; or to connect the fibers to various types of passive devices such as switches. dividers, or attenuators. It is highly desirable, if not necessary, that the connectors perform their function with a minimum of signal loss, and that the making of a connection be as simply and as quickly accomplished as possible. The central function of an optical fiber connector or connectors, which most often are in butting relationship, is the positioning and maintenance of two optical fiber ends so that their central cores are aligned and in contact with each other, thus insuring maximum transfer of optical signals from one fiber to the other. Achieving this desideratum is a particularly challenging task inasmuch as the light carrying region (the core) of an optical fiber is quite small, being on the order of eight microns (8 $\mu$m) diameter for single mode fiber. Another function of an optical fiber connector is to provide mechanical stability and protection of the actual connection in the working environment. Achievement of maximum signal transfer (minimum insertion loss) is a function of the alignment of the fiber cores, the width of the gap between the fiber ends, and the surface condition of the fiber end faces. Stability and junction protection are generally functions of the connector design including the material used. For example, a connector generally includes a glass or ceramic cylinder which contains the fiber to the connected, and the end face of which is designed to butt against the end face of a similar cylinder in the mating connector. Such a cylinder is commonly, called a ferrule, and it not only functions to align the core of the fiber, but, also, its end face is sufficiently smooth and flat to insure a uniform butting against the end face of the mating ferrule.

There are, at present, many different types of connectors in use, all of which are aimed at achieving low insertion loss within the connection, and stability. One such connector is shown in U.S. Pat. No. 4,934,785 of Mathis et al., and comprises a cylindrical ferrule, a base member which holds the ferrule, a compression spring, and a housing surrounding the ferrule and the spring. The ferrule is held rigidly in the housing by suitable adhesive, and the compression spring applies an axial force to the ferrule and housing so that the end face of the ferrule is maintained in contact with the mating ferrule of the second connector. Although such a connector performs its functions well, it has a high parts count assembled in a relatively complex arrangement. A high parts count means a more expensive connector, and, further, the risk of lost parts during assembly, especially in the field. With the increasing use of optical fibers as the transmission media of choice, there is a need for high density interconnect arrangements, hence expensive connectors with a high parts count unduly increase the cost of such interconnection arrangements.

Another type of connector is shown in U.S. Pat. No. 5,481,634 of Anderson et al. and comprises a cylindrical ceramic ferrule contained in a plastic base member to form the fiber holding structure. The fiber holding structure is mounted within a cylindrical housing having an opening therein through which the ferrule protrudes. A cylindrical spring surrounds the base member and interacts with an interior surface of the housing to urge the ferrule axially outward from the housing opening. The housing has a cantilever type spring latch located on one exterior side of the connector which is manually operable and which mates with a shoulder within the receptacle to lock the connector therein. While this particular type of connector lends itself readily to miniaturization, it has a fairly high part count and is, therefore, subject to the same objections as the Mathis et al. connector. Additionally, the compression spring is, in essence, a loose part, and therefore can easily be misplaced or lost during assembly of the connector.

Both of the aforementioned connectors are representative of prior art types, virtually all of which use coil springs to apply the contacting force. In many connectors, the springs also compensate for over-travel. That is, when a connection is made with an LC type connector (Anderson et al.), the ferrule first seats on the optical interface of the mating ferrule (or active device). It is then necessary for the plug housing to continue to advance until the cantilever latch clears the latching shoulder on the receptacle or adapter. The spring absorbs this additional axial advance and once the latch is engaged, the spring, being compressed, continues to apply an axial force between the latch and the plug body to maintain intimate contact at the interface.

There have been connector arrangements aimed at reducing the number of parts in the connector assembly. For example, in U.S. Pat. No. 5,719,997 issued Feb. 17, 1998, there is disclosed a connector having a one-piece molded plastic housing having an exterior cantilever latch. The connector has a cylindrical structure extending toward the front end of the housing which has an axial passage therein for receiving an optical fiber. The cylindrical member is rigidly held within the housing and avoids the use of a spring for applying a contacting force, and the connector is adapted to mate with a conventional connector within an adapter, with the conventional connector having a spring for applying the axial contacting force. Thus, the connector of that application has a very low part count, but relies upon the conventional mating connector to supply the necessary axial contacting force.

Glass optical fibers have, heretofore, been primarily used to bring optical signals to subscriber premises, where they are transformed into electrical signals for distribution throughout the premises. However, there has been a move toward extending the optical signals into and throughout the subscriber premises due to the development of plastic optical fiber (POF). POF has many advantages over glass optical fiber (GOF) for such use. POF is not as brittle as GOF, and does not require extremes of care in handling. POF is less expensive than GOF, thus making it attractive for local usage. Further, POF is not as demanding as glass fiber in alignment because of its larger diameter, hence, the precision ferrule is not a necessary component of the connector. On the other hand, POF has higher signal loss, not having the optical transmissivity of GOF, and hence is preferably used only in short transmission spans, such as within the subscriber premises. It is anticipated that various connections to the several type of apparatus are to be made by the subscriber or customer, hence, the connections will be facilitated by less complicated or sophisticated connectors. Such connections may be made to VCR's, television sets, camcorders, and other types of domestic equipment as well as to telephones, computers, and the like.

What is needed, and what the prior art appears to be lacking, is an optical connector having a low part count, reduced size, and which is readily insertable and removable from an associated receptacle without a tool or the need to grasp the opposite sides thereof which is difficult to do when a number of connections are crowded together, while insuring that positive optical contact is made with the mating connector or equipment terminal. In addition, the connector should be of such simplicity that the untrained user, i.e., customers, can readily assemble it.

SUMMARY OF THE INVENTION

The connector of the present invention and its associated adapter are used for terminating an optical cable or fiber, especially POF, while insuring positive optical contact for optimum signal transmission. The connector plug of the invention, in a preferred embodiment thereof, comprises a single molded plastic part having a passage extending axially therethrough. The passage has fiber holding means and a tapered portion extending from the holding means to the rear end of the plug. More particularly, a portion of the passage extending from approximately the middle of the plug toward the rear end has a portion having an enlarged diameter with internal threads, and a second tapered portion extending from the thread portion to the rear end of the plug. The diameter of the threaded portion is such that the threads grip the soft or resilient jacket. With POF, the insulating and protection jacket which surrounds the fiber is bonded to the fiber. Thus, when the jacket is screwed into the threaded portion, the fiber is mounted in the connector, and it is held firmly attached thereto.

A cantilever latch is mounted on (or integral with) the plug adjacent the front end thereof and extends upwardly and rearwardly therefrom. A cantilevered trigger member is affixed to the plug adjacent the rear end thereof and extends upwardly and forwardly of the plug and the front end of the trigger overlies the free end of the cantilever latch. On the top surface of the cantilever latch arm, approximately midway between the ends thereof is a locking tab for locking the latch, and hence the plug, in axial position against rearwardly directed axial forces. On each side of the cantilever latch arm is a radiused camming lobe, extending upwardly and positioned approximately midway between the two ends of the cantilever latch arm.

The receptacle or adapter has an opening therein and an internally extending bore shaped to receive the plug and cantilever latch. The dimensions of the bore are such that when the plug is inserted into the adapter, the cantilever latch arm is depressed until the locking tab passes a shoulder in the bore, at which point the elasticity of the arm causes the locking tab to spring upward to bear against the shoulder and secure the plug against rearward tension. On either side of the shoulder and extending therefrom in a forward direction are first and second sloped or ramped surfaces which slope upwardly toward the operative end of the adapter and against which the radiused camming lobes are adapted to bear when the plug is inserted into the adapter. The natural elasticity of the cantilever latch arm forces the lobes into contact with the ramped surfaces with a resultant downward and forward force being applied through the lobes to the plug. Thus, the lobes tend to move up the slope and the ferrule member is moved forward into contact with the mating coupler or fiber end. The resilience or elasticity of the cantilever latch arm thereby supplies the desired axial contacting force.

Because POF does not require the very precise alignment of the fiber in the connector, it is not necessary to have a precision device such as a ferrule for the fiber at the interface. Thus, the user can achieve sufficient alignment by simply screwing the jacketed fiber into the threaded portion. On the other hand, support means for the fiber end at the interface may be used if desired.

The connector assembly of the invention thus has very few parts, is economical to manufacture, is as simple to operate as a standard telephone jack, and makes the use of optical fiber within the subscriber premises plausible and feasible.

The numerous features and advantages of the present invention will be more readily apparent from the following detailed description, read in conjunction with the drawings.

DETAILED DESCRIPTION

Figure 1:
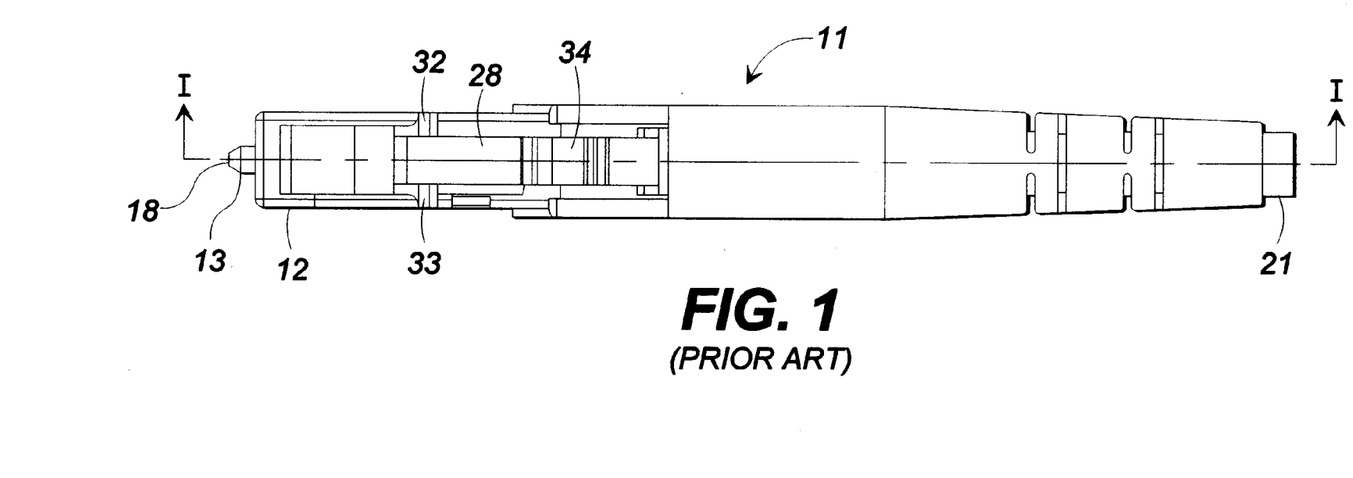
FIG. 1 is a plan view of a prior art LC type connector as used for connecting optical fibers.
Figure 2:
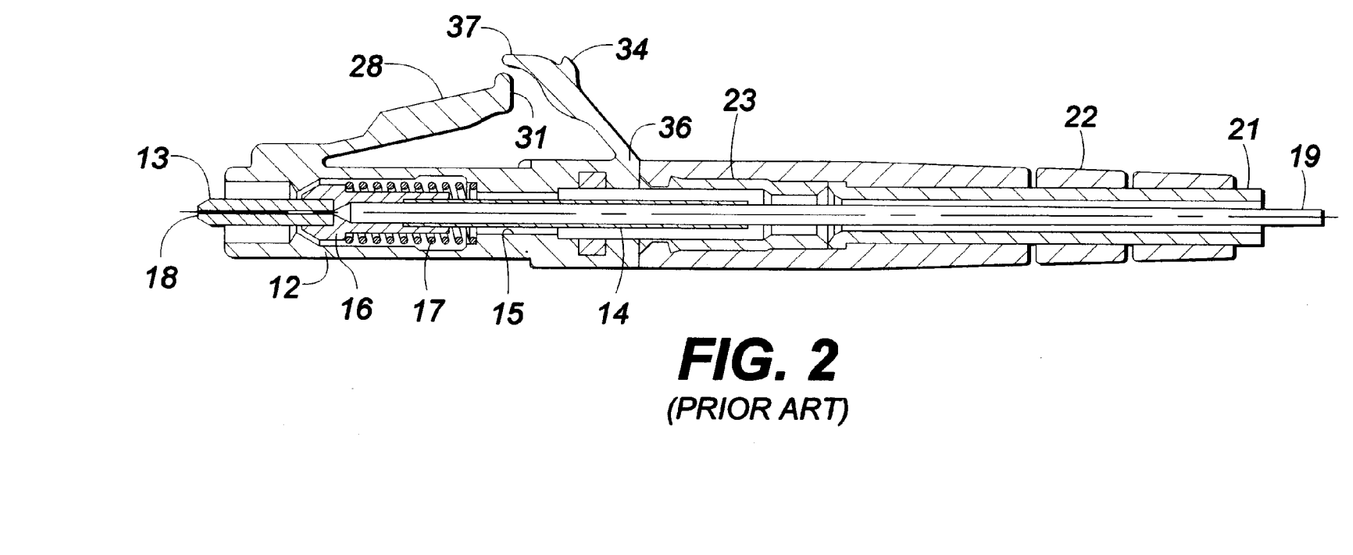
FIG. 2 is a cross-sectional view of the connector along the line I—I of FIG. 1.

FIG. 1 is a plan view of a prior art LC connector 11, and FIG. 2 is a cross-thereof along the line I—I of FIG. 1. In addition, FIG. 3 is an exploded perspective view of an LC connector and FIG. 4 is a perspective view of a detail thereof.

Connector 11 which, as shown in the several views, is of generally rectangular configuration, comprises a bored housing member 12 which contains, within a bore 15 and axially aligned therein, a ferrule 13 and barrel member 14 to which the ferrule 13 is affixed. The barrel member 14 has an enlarged portion or flange 16 which forms a shoulder against which one end of a coiled spring 17, which surrounds the barrel, bears. The other end of spring 17 bears against a shoulder formed in the bore 15 within housing 12. As a consequence, the ferrule and barrel assembly has a forward bias relative to the housing 12, which, as discussed hereinbefore, insures face-to-face contact of the ferrule end face 18 with the ferrule end face of a mating connector or equipment (not shown). An optical fiber 19, loosely encased in a jacket 21 having Kevlar® strength members, is entrant into connector 11 through a strain relief boot 22 and a base member 23, which has latches 24 for mounting to housing 12 at the rear thereof. The rear of base member 23 has a grooved portion 26 extending axially therefrom onto which jacket 21 or the strength members are gripped. This is made possible by the fact that the glass optical fiber 19 is loosely surrounded by jacket 21 so that jacket 21 may be pulled without affecting fiber 19. In FIGS. 3 and 4, a protective end plug 27 is shown which protects the end face 18 of ferrule 13 during handling. End plug 27 is, of course, removed prior to installation of the connector.

Figure 3:
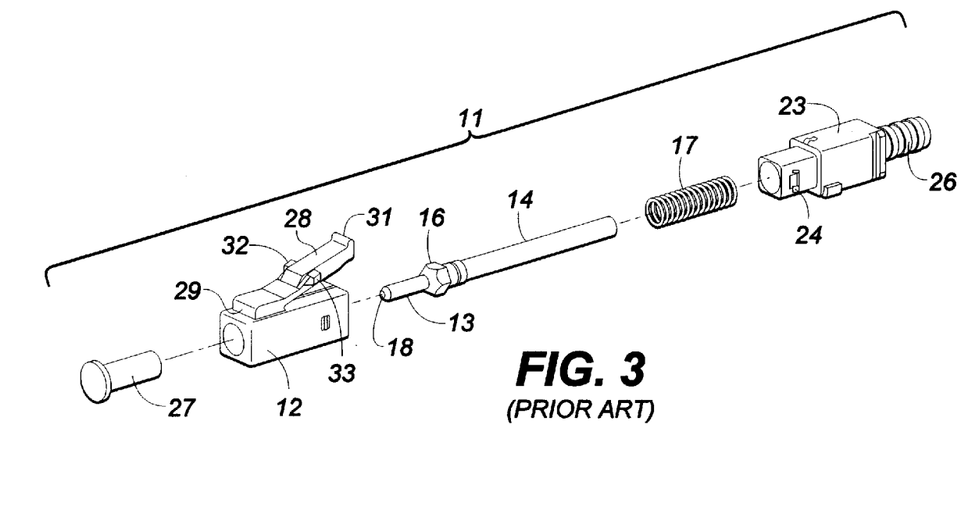
FIG. 3 is an exploded perspective view of the connector of FIGS. 1 and 2.
Figure 4:
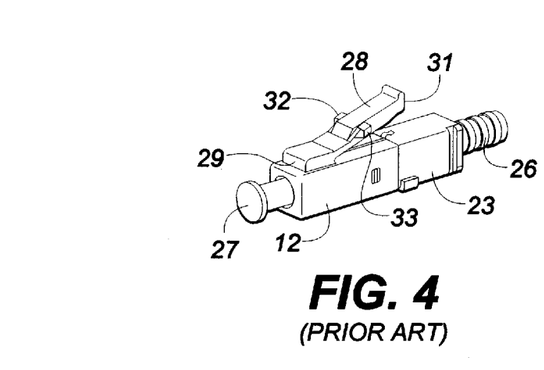
FIG. 4 is a perspective view of the connector of FIGS. 1, 2, and 3, as assembled.

An exterior surface of housing 12, as shown in FIGS. 2, 3, and 4, the top surface, has extending therefrom a cantilever latch arm or member 28 having one end 29 affixed to the housing 12, and a free distal end 31 as shown. Latch member 28 has first and second lobes or shoulders 32 and 33 which are adapted to engage latching shoulders in the connector receptacle or adapter (not shown). When connector 12 is inserted into an adapter or receptacle, latch arm 28 is depressed as the connector is moved forward until a clearance within the adapter allows the lobes 32 and 33 snap into latching engagement with shoulders formed within the adapter. When it is desired to remove the connector from the adapter, depression of the free end 31 of latching arm 28 disengages the lobes from the shoulders and the connector may be pulled out. As best seen in FIG. 2 (not shown in FIGS. 3 and 4), a cantilevered trigger member 34 having one end 36 affixed to the housing 12, or it may be affixed to base member 23, has its free end 37 overlying the free end 31 of the latching arm 28. When a user desires to remove the connector from its associated adapter or receptacle, he or she can depress latching arm 28 by depressing the free end 37 of trigger member 34. In a crowded area, or where there are a number of closely adjacent connectors, trigger member 34 facilitates the process of connector removal or disconnect without requiring a physical gripping of the sides of the connector.

The LC type connector has a part count that is undesirably high, as many as seventeen separate parts in a dual installation, for example. Thus, even though it is a relatively simple type of connector and lends itself readily to size reduction, it lacks the requisite low part count to make in-home use with POF entirely feasible. The remainder of the specification deals with modifications to the LC type connector to achieve these desirable ends, although the invention is by no means limited to an LC type connector.

Figure 5:
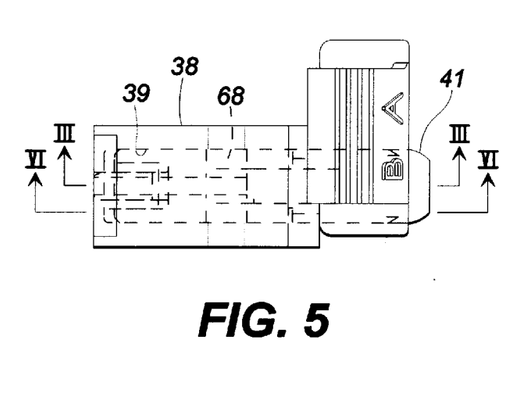
FIG. 5 is a plan view of the connector of the invention as inserted within the adapter or receptacle.
Figure 6:
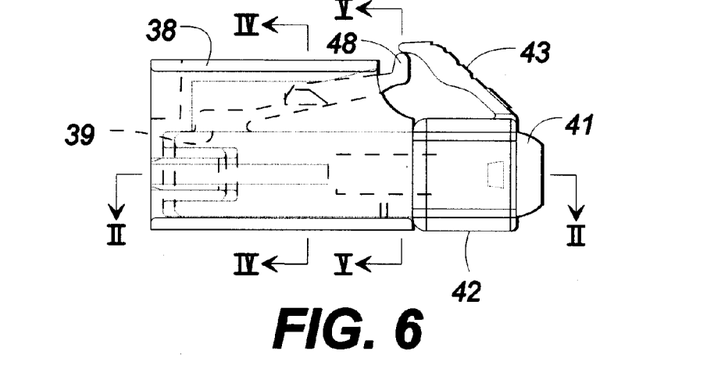
FIG. 6 is a side elevation view of the assembly of FIG. 5.
Figure 7:
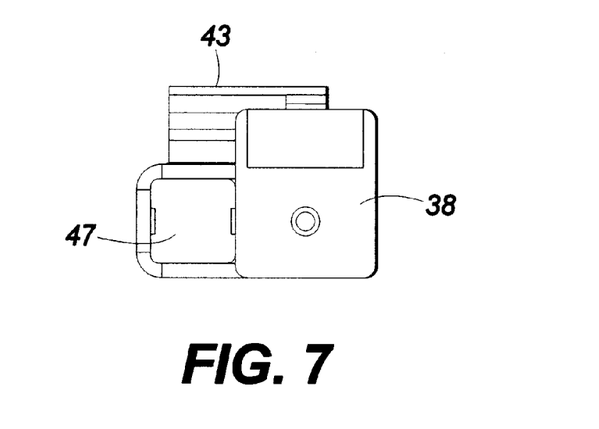
FIG. 7 is an end view of the operative or mating end of the assembly of FIGS. 5 and 6.
Figure 8:
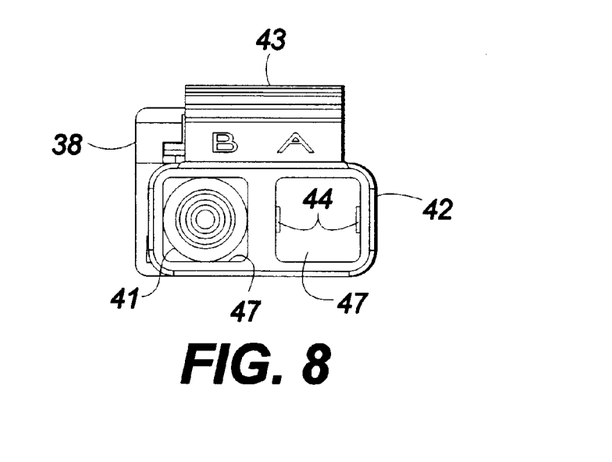
FIG. 8 is an end view of the rear or cable (or fiber) entrant end of the assembly of FIGS. 5 and 6.
Figure 9:
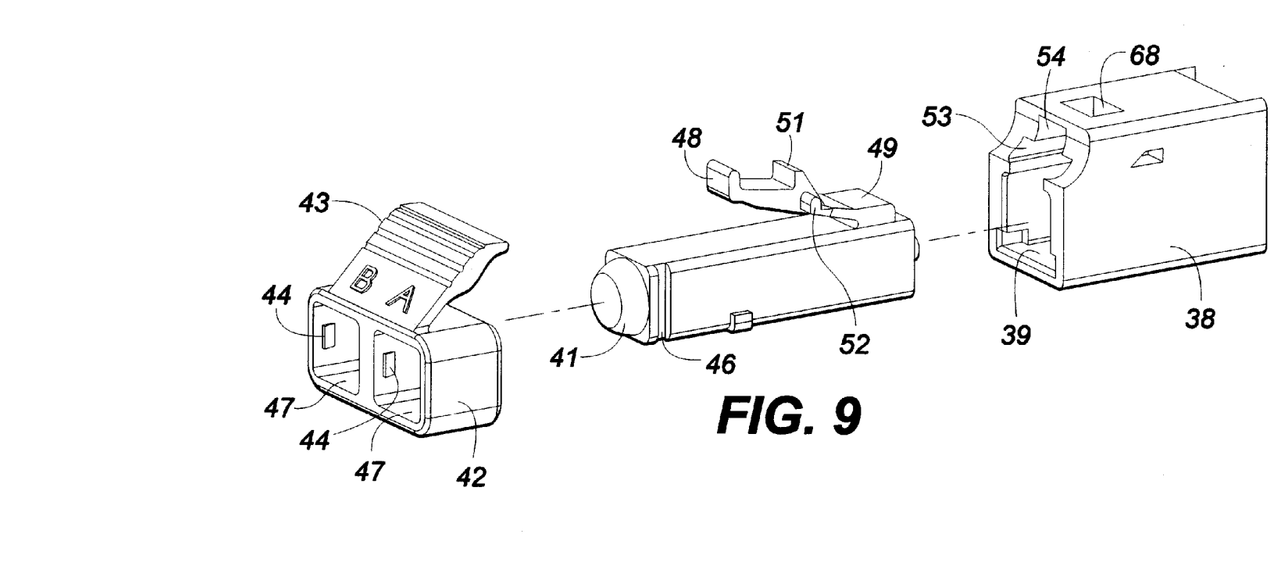
FIG. 9 is an exploded view of the connector and adapter assembly of FIGS. 5 and 6.
Figure 10:
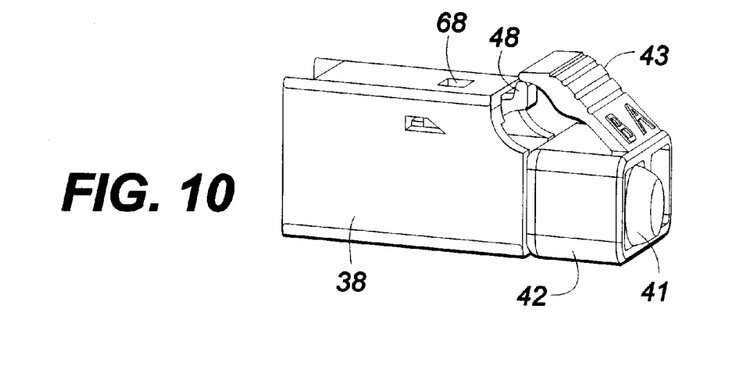
FIG. 10 is a perspective view of the connector-adapter assembly as assembled.

FIGS. 5 and 9, are a plan view and a side elevation and an exploded perspective view of the connector and adapter assembly of the present invention. The assembly comprises a receptacle or adapter member 38 having a bore 39 extending therethrough for receiving a connector member 41, as will be discussed more fully hereinafter, as best seen in FIG. 9. A trigger holding member 42 having a cantilevered trigger 43 affixed at one end thereof is latched to the connector 41 by latching means 44 on the member 42 and grooves 46 on the connector 41. Trigger holding member 42 is shown as a duplex member, i.e., having two openings 47 for receiving connectors 41. However, adapter 38 is shown as a single connector receiving member, although it, too, can be a duplex arrangement. Also, trigger holding member 42 may be made integral with connector 41 or otherwise affixed thereto. Connector 41 has, a cantilever latching arm 48 affixed at its proximal end 49 to connector 41. Arm 48 is preferably molded with connector 41, either in a single or dual version, of suitable plastic material, and hence, is integral therewith. On the top surface of arm 48, approximately midway between the distal and proximal end thereof, is a latching projection or tab 51, and on either side thereof is a radiused camming lobe 52, only one of which is shown. As best seen in FIG. 6, the distal end of the trigger arm 43 overlies the distal end of the latching arm 48 for actuation as described hereinbefore. As will be more clearly shown in the remaining figures, the bore 39 in adapter 38 is rectangular for receiving rectangular connector 41, and opens into a first channel 53 which, in turn, opens into a second channel 54. First channel 53 is wide enough to accommodate both camming lobes 52, and second channel 54 is wide enough to accommodate cantilever latch arm 48. Adapter 38, itself, is mountable in equipment or on a connector panel or elsewhere by suitable mans, not shown. A better understanding of the construction and functional relationship of the connector 41 and the adapter 38 may be had with reference to FIGS. 11 through 20.

Figure 11:
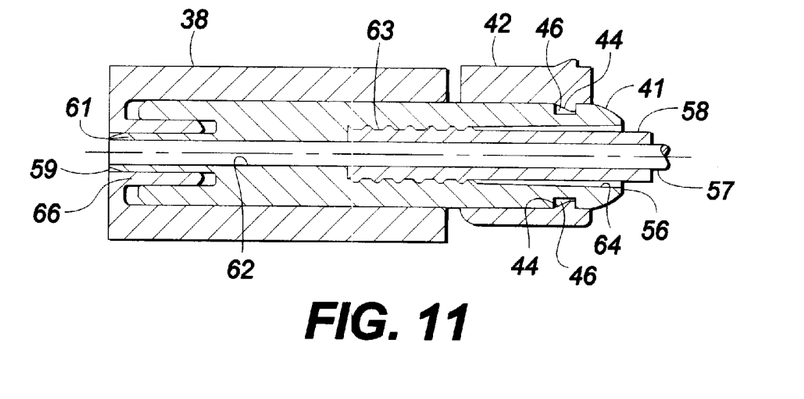
FIG. 11 is a cross-sectional view of the assembly of the invention along the line II—II of FIG. 6.

FIG. 11, which is a cross-sectional view along the line II—II of FIG. 6 shows the configuration and relationship of three basic parts of the connector-adapter assembly of the present invention. Connector 41 has a cable or fiber receiving end 56 for receiving a plastic optical fiber 57 and its opaque jacket 58 bonded thereto. Optical fiber 57 generally exceeds approximately 300 μm in diameter. Jacket 58 is approximately 0.5 mm thick. In the present embodiment the operative end 59 of connector 41 has a reentrant construction which forms a tubular ferrule 61, and a bore 62 extends from the front end 59 of connector 41 to the rear end 56. Bore 62 has an internally threaded enlarged portion 63 commencing approximately midway between the ends 56 and 59 of connector 41 and extending a short distance toward end 56, as shown. An outwardly tapered portion 64 extends from the rear end of the threaded portion 63 to end 56. The tapered portion 64 facilitates insertion of the jacketed fiber, with a length of fiber stripped of its jacket, into connector 41. As the jacketed fiber reaches the threaded portion 63, it is further advanced by screwing the soft resilient jacket into the threaded portion 63. One of the differences between GOF and POF is that, in GOF, the glass fiber is loose within the jacket, whereas the plastic fiber is fixed within the jacket. Hence, the external grooves of the standard LC connector, as shown in FIG. 4, for example, cannot be used to affix the POF jacket to the connector. For this reason, the internal threaded portion 63 is used to affix jacket 58 and fiber 57 within the connector. Also, with POF, the precision of alignment that is require for GOF, which requires a ceramic, metallic, or glass ferrule, is not required and the ferrule or support 61 may be molded integrally with the connector 41, and serves primarily as a support for the fiber 57 rather than a precision alignment device, and does not require cementing the fiber therein. Likewise, adapter 38 has a reentrant portion 66 molded integrally therewith and forming a tube 65 for receiving and aligning ferrule 61, which the standard LC connector does not have. The trigger holding member 42 is shown in FIG. 11 as latched in place by latch means 44 and latch grooves 46. Thus, as thus far described, the single fiber connector-adapter assembly comprises three separate parts; the connector 41, the adapter 38, and the trigger holding member 42, although member 42 may be integral with connector 41, in which case there are only two parts, as opposed to at least six parts for the standard LC connector.

Figure 12:
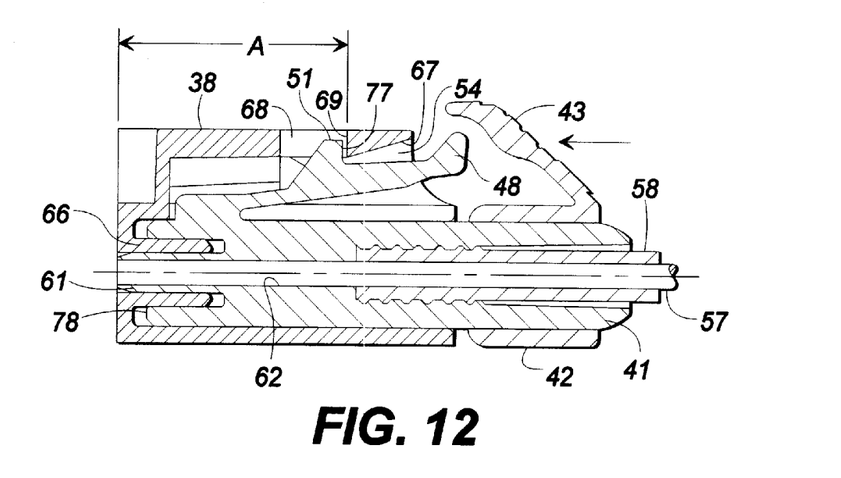
FIG. 12 is a cross-sectional view of the assembly of the invention along the line III—III of FIG. 5 illustrating an intermediate position of the connector within the adapter.
Figure 13:
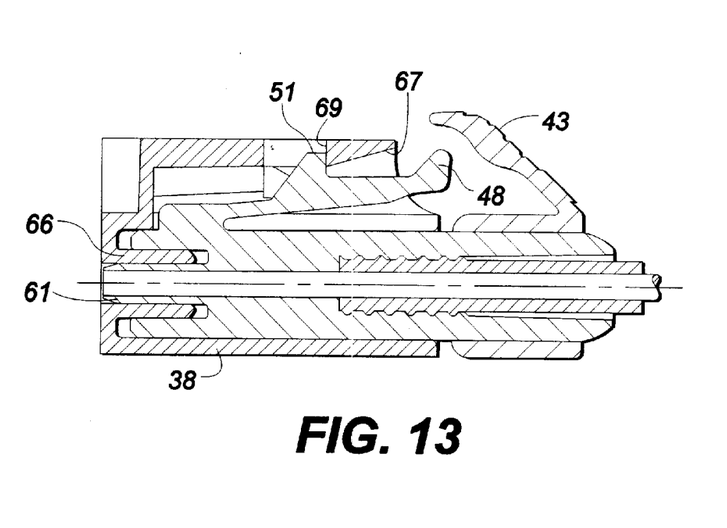
FIG. 13 is a cross-sectional view of the assembly of the invention along the line III—III of FIG. 5 illustrating the latched position of the connector within the adapter.
Figure 14:
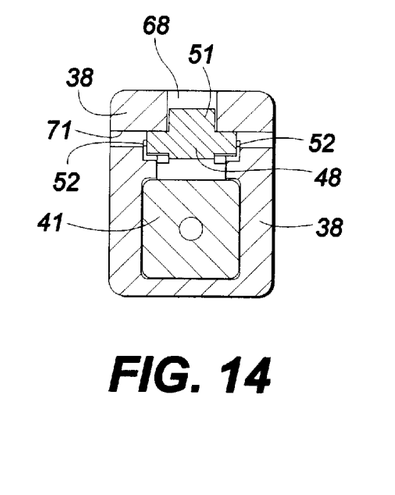
FIG. 14 is a cross-sectional view of the assembly of the invention along the line IV—IV of FIG. 6.

FIG. 12 depicts the connector 41 inserted within adapter 38, and illustrates how the latching tab 51 on the cantilever latching arm 48 snaps into latching position. The upper surface of second channel 54 has a sloped portion 67 leading into the adapter 38 which, as the connector moves in the direction of the arrow, forces tab 51 downward. (As will be explained hereinafter, camming lobes 52 also perform this function.) Tab 51 and arm 48 remain depressed until tab 51 encounters an opening 68 in adapter 38 which forms a shoulder 69 within second channel 54. The elasticity of arm 48 causes latching tab 51 to snap up into opening 68, thus when a force opposite to the direction of the arrow is exerted on connector 41, tab 51 butts against shoulder 69 and prevents connector 41 from being withdrawn, as shown in FIGS. 13 and 14.

Figure 15:
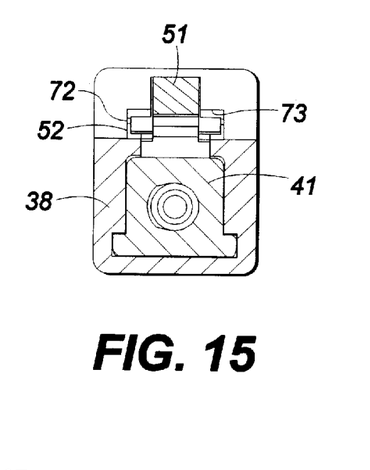
FIG. 15 is a cross-sectional view of the assembly of the invention along the line V—V of FIG. 6.
Figure 16:
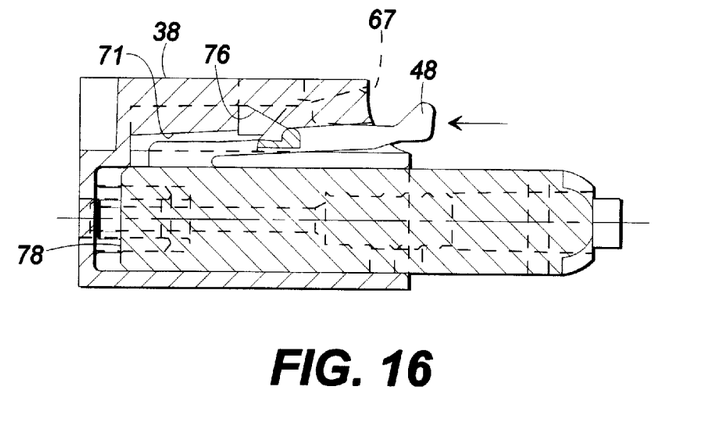
FIG. 16 is a cross-sectional view of the assembly of the invention along the line VI—VI of FIG. 5, showing the connector partially inserted within the receptacle or adapter.
Figure 17:
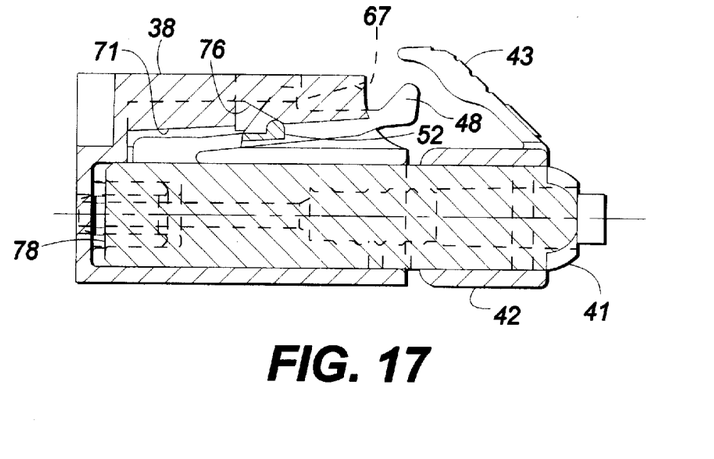
FIG. 17 is a cross-sectional view of the assembly of the invention along the line VI—VI of FIG. 5, showing the connector in its latched position within the adapter.
Figure 18:
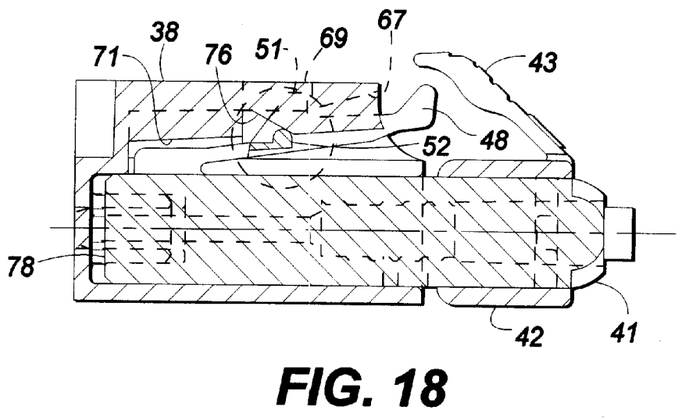
FIG. 18 is a cross-sectional view of the assembly of the invention along the line VI—VI of FIG. 5, showing the connector in its forward biased position within the adapter.
Figure 19:
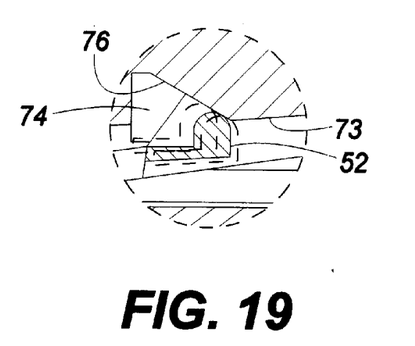
FIG. 19 is a detail view taken from FIG. 18.
Figure 20:
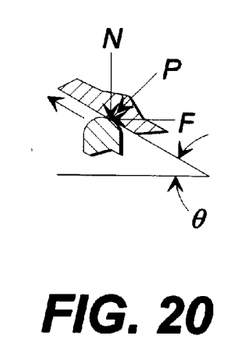
FIG. 20 is a detail from FIG. 19 illustrating the forces on the connector when assembled within the adapter.

FIGS. 15, 16, 17, and 18 depict the action of the camming lobes 52 during and after insertion of connector 41 into adapter 38. For simplicity, member 42 has been omitted from FIG. 16. As best seen in FIG. 15, first channel 53 is slightly wider than latching arm 48 with the two camming lobes 52 on either side thereof so that arm 48 can move freely in a longitudinal or axial direction therein. The upper surface of channel 53 is interrupted by the second channel 54, which, being narrower than channel 53, forms first and second narrow camming surfaces 72 and 73. As best seen in FIGS. 16. 17, and 18, surfaces 72 and 73 have a slightly downward slope from the rear of adapter 38 toward the front against which camming lobes 52 slide as the connector 41 is inserted into adapter 38 and pushed forward. This downward slope functions to force latching arm 48 downward as the connector is moved forward. A notch 74 is formed in each of the camming surfaces 72 and 73 which has a sloped camming ramp 76 which commences from a point slightly forward of shoulder 69 and slopes upward from rear to front at an angle θ which is preferably in a range of 20° to 45°, with 27.3° being an optimum value. As the connector 41 is inserted into adapter 38, latching arm 48 is depressed as shown in FIG. 16 as a result of the camming action of the sloping camming surfaces 72 and 73 until the camming lobes 52 enter the notch 74 and commence to ride upward and forward on sloped camming surface 76. This upward and forward movement can best be understood with reference to FIGS. 19 and 20. FIG. 19 depicts a camming lobe 52 on surface 76 and FIG. 20 depicts the forces thereon, which result from the inherent springiness of the latching arm 48. These forces exist even in the absence of any external force, and there is, as shown in FIG. 20, a resultant downward and forward force labeled P. This forward force is the equivalent of the contacting force supplied by the coil spring in the standard LC connector. As the latching tab 51 moves past shoulder 69, the spring force exerted by the latching arm 48 causes it to snap up into opening 68, as shown in FIG. 17, which is made possible by each of the camming lobes 52 bearing against the sloped surface 76 within notch 74, thereby allowing upward movement of latching arm 48. With the connector 41 thus seated and secured within adapter 38, no further force need be applied by the installer or the operator making the connection. However, there is still a forward force applied because of the spring force of the latching arm 48 forcing camming lobes 52 against their respective slopes 76, and this force insures proper butting engagement of the face of the ferrule and the optical fiber contained therein with a mating coupler or connection. The resultant configuration is shown in FIG. 18.

The connector-adapter assembly as shown in FIG. 18 compensates for over travel in the manner of the coil spring as discussed hereinbefore, and insures that there is always a positive contracting force applied at the face of the ferrule. To insure this end, the angle θ of the sloping surface, 76 must be chosen to allow variable positioning of the plug or connector 41 to compensate for tolerances on the position controlling features on the connector or plug and the adapter. In addition, the angle θ must be such that the connector always has a forward axial loading. Thus, the forward axial force must be greater than frictional resistive force, i.e., the ramp 76 angle θ must be greater than the angle of friction. With reference to FIG. 20, the following relationship are observed:

| N = | P cos θ | (1) |
|---|---|---|
| F = | P sin θ | (2) |
| f = | frictional resistance = N tan φ | (3) |
| | where φ is the frictional angle | |
| | and tan θ > tan φ | (4) |

Inequality (4) insures that there is end face contacting force at the optical interface. The dimension A, shown in FIG. 12, which is the distance from the bearing face 77 of the latching tab 51 to the optical interface 78 of ferrule 61 is controlled by polishing the bearing face 77 to insure that the latching position shown in FIG. 13 is slightly less than the butting position of interface 78. The interaction of the camming lobe 52 with the ramp 76 then insures that a forward biasing force moves the interface 78 into proper butting position, shown in FIGS. 12 and 18. If, after the plug or connector 41 is seated within adapter 38 and the interface 78 bears against a matching fiber interface, a rearward pulling force is applied to the cable or fiber 57 that exceeds the forward bias or load provided by latching arm 48, the plug or connector 41 will move rearward until the bearing face 77 of latching tab 51 butts against shoulder 69, as shown in FIG. 13, for example. Plug 41 will remain in this position until the rearward load is removed, at which time, the forward spring force generated by camming lobes 52 on ramps 76, and the spring action of arm 48, returns the plug 41 to the mating or equilibrium position in contact with a mating connector or other equipment.

Figure 21:
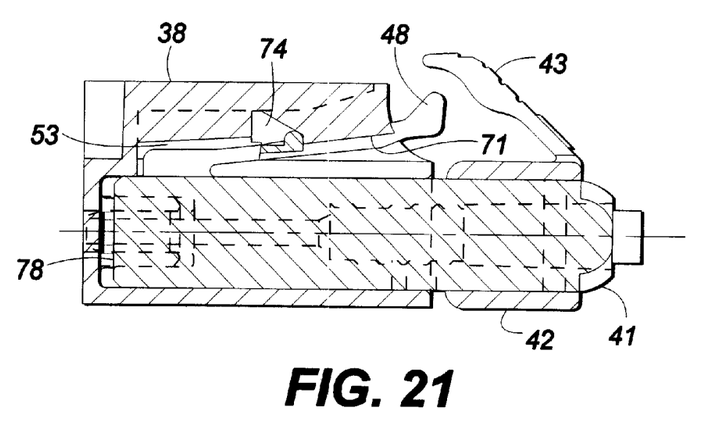
FIG. 21 is a cross-sectional view of a second embodiment of the connector.
Figure 22:
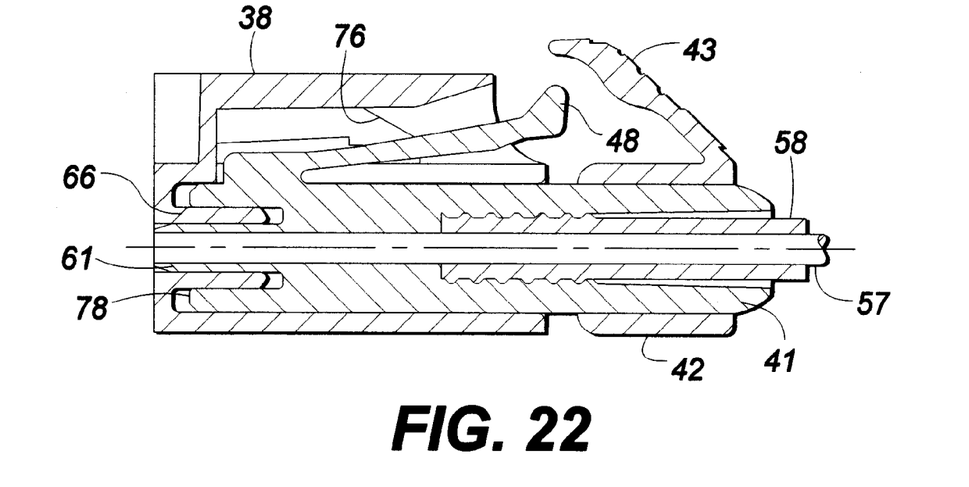
FIG. 22 is a cross-sectional view of the connector and adapter assembly of FIG. 21.
Figure 23:
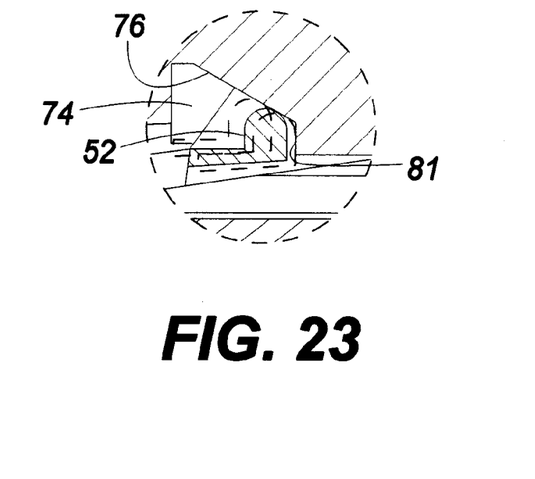
FIG. 23 is a detailed view of a portion of the connector and adapter assembly of FIGS. 21 and 22.

In FIGS. 21, 22, and 23 there is shown a second embodiment of the invention wherein the camming lobes 52 perform a latching function as well as a forward biasing function, thereby eliminating the need for latching tab 51, opening 68, and shoulder 69. For consistency, those elements of FIGS. 21, 33, and 23 which are unchanged from those of the preceding figures bear the same reference numerals as in the preceding figures.

In the detail shown in FIG. 23, it can be seen that the lower end of sloping ramp 76 terminates in a vertical (relative to the axis) shoulder 81, against which lobes 52 bear in the latched position, as shown in FIG. 21, thereby resisting any axial pulling forces that may occur. When the connector 41 is inserted into the adapter 38, the camming lobes are held down by the top surface 71 of channel 53 until they reach notch 74, at which time they snap up into the notch 74 and prevent connector 41 from being moved rearwardly.

The connector and adapter with the fiber anchoring threads of the present invention as described in detail hereinbefore have an extremely low parts count. As can be seen, there are only two principal parts to the assembly which achieves the same or similar results for POF as the standard LC connector and adapter do for GOF with a relatively large number of parts. Assembling the POF to the connector and inserting the connector into the adapter are, with the present inventions, operations that can be performed by virtually anyone, and the whole process can be completed in a minimum amount of time. The simplicity of the arrangement enables the user to plug and unplug equipment as easily as is now done for his or her telephone equipment.

In concluding the detailed description, it should be noted that it will be obvious to those skilled in the art that many variations and modifications may be made to the preferred embodiment as set forth in detail in the foregoing, without substantially departing from the principles of the present invention. It is intended that all such variations and modifications be included as being within the scope of the present invention as set forth in the claims. Further, in the claims hereinafter, the corresponding structures, materials, acts, and equivalents of all means or step plus function elements are intended to include any structure, material, or acts for performing the functions with other elements as specifically claimed.

We claim:

1. A connector for attachment to an optical fiber cable which comprises at least one plastic optical fiber surrounded by resilient a jacket which is bonded thereto, the connector including a tubular housing having latching means for securing it to an associated adapter, the housing including a longitudinally extending passageway and having an interface end and a cable entrant end, the passageway being sized to receive the optical cable, Characterized in that:

said passageway has a cable anchoring structure therein comprising an internally threaded portion extending along at least a portion of the length of said passageway, said threaded portion being sized to grip the resilient jacket when said cable is screwed into said threaded portion.

2. A connector as claimed in claim 1 and further characterized in that:

said passageway has a tapered portion extending from said internally threaded portion toward said cable entrant end.

3. A connector as claimed in claim 2 and further characterized in that:

said tapered portion of said passageway has a greater dimension at the cable entrant end than at the end thereof that adjoins said internally threaded portion.

4. In combination, an optical connector attached to an end portion of an optical fiber cable, said cable including a transparent optical fiber surrounded by an opaque jacket affixed thereto, a portion of said jacket being removed from an end portion of said optical fiber cable to expose the optical fiber;

said optical connector including:
 a molded plastic housing having an interface end and a cable entrant end, and a longitudinal passageway extending therebetween; and
 a cable-holding structure in said passageway comprising an internally threaded portion sized to grip said jacket, said cable being screwed into said threaded portion.

5. The combination as claimed in claim 4 wherein said internally threaded portion has a first end spaced from said interface end and a second end spaced from said cable entrant end.

6. The combination as claimed in claim 5 wherein said passageway has a circular tapered portion extend from said second end to said cable entrant end.

7. The combination as claimed in claim 5 wherein said tapered portion has a larger diameter at said cable entrant end than at said second end.

* * * * *